S. A. BROWN.
BATTERY HOLDER.
APPLICATION FILED JAN. 6, 1908.

925,452.

Patented June 22, 1909.
2 SHEETS—SHEET 1.

Witnesses, Henry Doersam
Ernest Fisher

Seth A. Brown Inventor.

NORRIS PETERS, INC., LITHO., WASHINGTON, D. C.

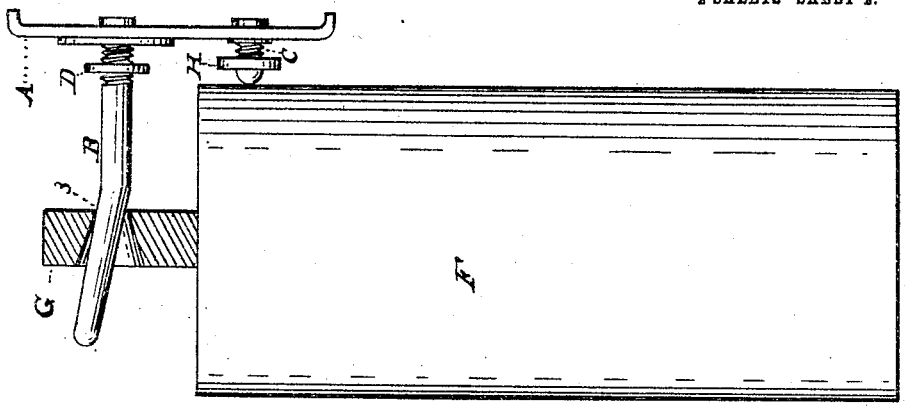
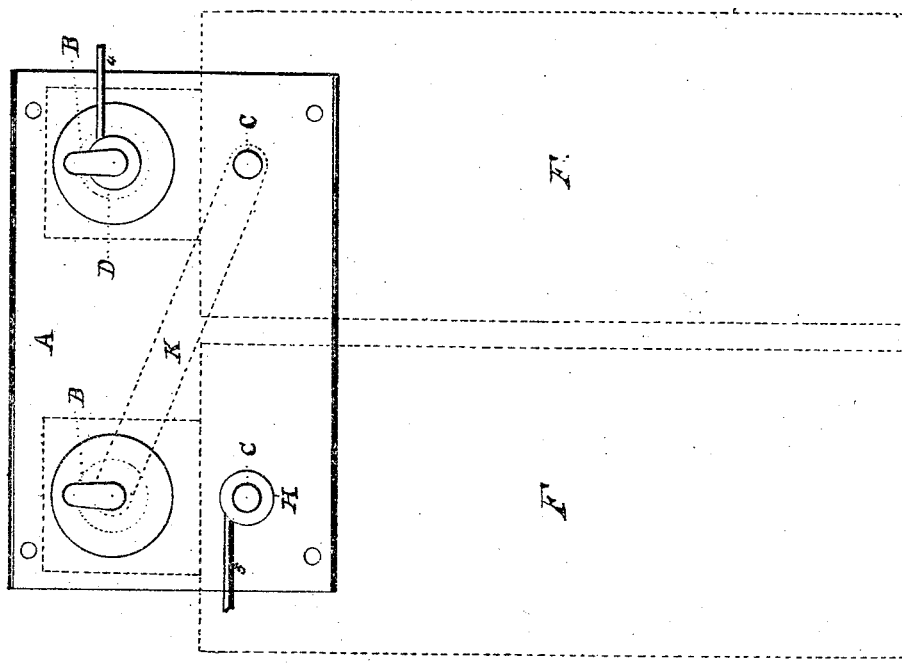

UNITED STATES PATENT OFFICE.

SETH A. BROWN, OF BUFFALO, NEW YORK.

BATTERY-HOLDER.

No. 925,452.  Specification of Letters Patent.  Patented June 22, 1909.

Application filed January 6, 1908. Serial No. 409,463.

*To all whom it may concern:*

Be it known that I, SETH A. BROWN, a citizen of the United States, residing at Buffalo, in the county of Erie and State of New York, have invented a new and useful Improvement in Battery-Holders, of which the following is a specification.

The object of my invention is to provide a quick and easy means of connecting batteries to the instruments which they operate such as bells, telephones, alarms sparkers &c, enabling people of no especial skill to connect and renew the batteries when worn out. Also it has for its object to reduce the cost of construction by dispensing with the usual binding screws, using the weight of the battery to form the contact, being more particularly adapted to what are known as dry batteries.

Figure 1:
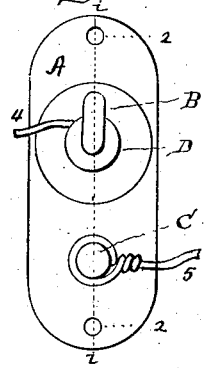
Figure 2:
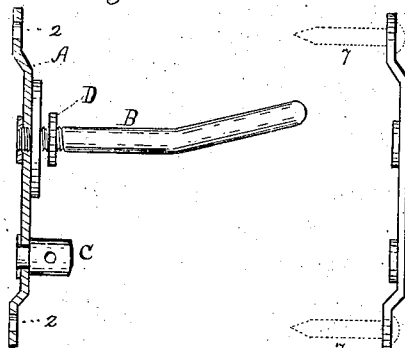
Figure 3:
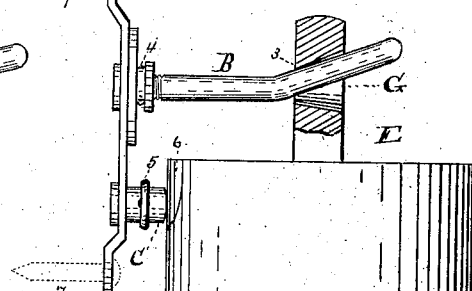
Figure 4:
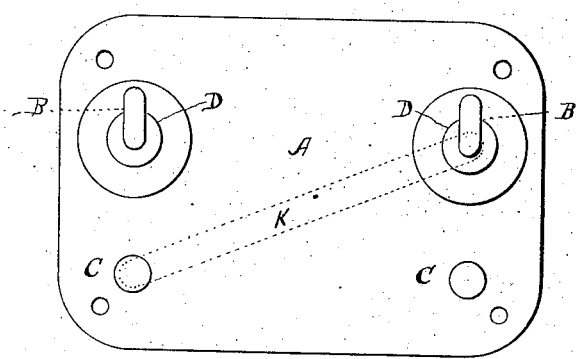
Figure 6:
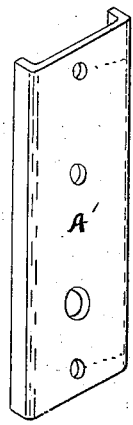
Figure 5:
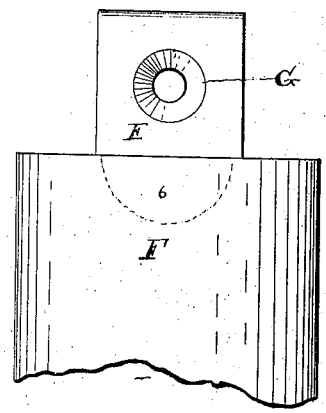

In the drawings Figure 1 shows a front view of the holder adapted for one cell. Fig. 2 is a side view of same with a section of the holder taken through the dotted line $i'$, $i'$, Fig. 1. Fig. 3, is a side view of same with cell in position. Fig. 4, shows a holder adapted to two cells. Fig. 5, is a view of top part of cell. Fig. 6, shows a modified form of insulating plate. Fig. 7 shows the holder supporting two cells. Fig. 8 shows an end view of holder.

The holder or plate A, which can be made of any suitable insulating material, preferably vulcanized fibers; has holes 2, 2, for securing it in place and has an offset at each end so as to clear the backs of the pins B and C from the object to which it is secured; the connecting pins B and C are secured to the plate A in any suitable way, the pin B is bent upward for a portion of its length to form an incline on which slides the perforated element E of the cell F, the weight of the cell causing it to be carried toward the plate A and forming and maintaining a connection between the zinc cylinder and the pin C, when a paper covering is used on the zinc cylinder it can be cut away as at $b$ to allow of the contact with the pin C. The element E can be made with a straight hole, but the tendency of the inclined pin B is to throw the top of the cell inward and the bottom outward. I therefore prefer to have the hole tapered as shown at G. This causes the element to bear on one side 3, which is off from the center of gravity of the cell, thus causing the latter to hang plumb.

One wire can be connected to the pin B and secured by the nut D, the other wire can be inserted in the hole of pin C and wound around the latter, or both pins can have securing nuts D, H, as shown in Figs. 7 and 8. These wires can be extended in the usual manner to whatever instrument it is desired to operate, and when once in place do not require to be shifted when changing the cells.

When two or more cells are used, the connection between the bearing pins is made by a metal strip or wire K on the back of the holding plate A, as shown in Fig. 4, where two opposite poles are connected for intensity.

In the drawing Fig. 7, the upper pin B' and the lower pin C form the terminals for the wires 4 and 5, which are secured thereto by the nuts D and H. Instead of having two or more sets of supporting pins on one plate $a$ shown in Fig. 4, several plates each having one set of pins as shown in Figs. 1, 2 3 can be used and the pins connected by wire for quantity or intensity as desired.

It can readily be seen from the foregoing that after the plate A is secured to a wall or other stationary object and the wires are in place all that is necessary to establish the connection with the battery is to hang the latter on the pin B.

By dispensing with the usual metal binding screws, the cost of the cell is lessened.

The insulating pins for supporting and connecting a battery cell with the instrument which it is to operate constitute a new article of manufacture which I prefer to construct substantially as shown and described, but various modifications can be used which employ the principle of gravity connection.

I claim—

1. In a battery holder, a plate formed of insulating material, adapted to be attached to a wall or support and having an upturned pin at its upper part and a shorter pin at its lower part, both pins having means for attaching electric wires thereto.

2. In a battery holder, a plate formed of insulating material, having edges turned approximately at right angles to its surface, said plate adapted to be attached to a wall or support and having an upturned pin at its upper part and a shorter pin at its lower part, said pins having means for attaching electric wires thereto.

3. In a battery-holder, a plate formed of insulating material and having at its upper part a plurality of upturned pins adapted to support an equal number of battery cells each by contact with one element of the cell, the lower part of the plate having shorter pins adapted to make contact with the other element of the cell, the upper and lower pins being so connected that an electrical series will be formed when the cells are hung upon the upper pins, the terminal pins of such series having means for connecting wires thereto, substantially as described and shown.

SETH A. BROWN.

Witnesses:
HENRY DOERSAM,
ERNEST FISHER.